United States Patent
Wang

(10) Patent No.: US 10,007,098 B2
(45) Date of Patent: Jun. 26, 2018

(54) OPTICAL SYSTEMS AND METHODS

(71) Applicant: Yaujen Wang, Arcadia, CA (US)

(72) Inventor: Yaujen Wang, Arcadia, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 772 days.

(21) Appl. No.: 14/098,231

(22) Filed: Dec. 5, 2013

(65) Prior Publication Data

US 2015/0098002 A1 Apr. 9, 2015

Related U.S. Application Data

(63) Continuation-in-part of application No. 14/049,993, filed on Oct. 9, 2013, now abandoned.

(51) Int. Cl.
| | | |
|---|---|---|
| G02B 3/02 | (2006.01) | |
| G02B 13/18 | (2006.01) | |
| G02B 27/00 | (2006.01) | |
| G02B 13/16 | (2006.01) | |

(52) U.S. Cl.
CPC ............. *G02B 13/18* (2013.01); *G02B 13/16* (2013.01); *G02B 27/0025* (2013.01); *Y10T 29/49826* (2015.01)

(58) Field of Classification Search
CPC ...... G02B 5/208; G02B 13/14; G02B 13/143; G02B 13/146; G02B 13/008; G02B 13/18
USPC ......... 359/354–357, 642, 676–690, 745–795
See application file for complete search history.

(56) References Cited

U.S. PATENT DOCUMENTS

| | | | | |
|---|---|---|---|---|
| 6,208,474 B1* | 3/2001 | Kondo | ................... | G02B 13/24 359/771 |
| 6,507,445 B1* | 1/2003 | Shimomura | ....... | G02B 27/4211 359/740 |
| 7,339,741 B1* | 3/2008 | Wang | ................... | G02B 13/146 250/339.01 |
| 7,369,303 B2* | 5/2008 | Tejada | ................... | G02B 13/14 359/355 |
| 7,812,296 B2 | 10/2010 | Hayashi | | |
| 8,294,988 B2 | 10/2012 | Cook | | |
| 2002/0005938 A1* | 1/2002 | Omura | ................. | G02B 5/1857 355/53 |
| 2002/0167738 A1* | 11/2002 | Mori | ........................ | G02B 9/34 359/771 |
| 2004/0264008 A1* | 12/2004 | Nishina | .................... | G02B 9/62 359/776 |
| 2010/0265355 A1* | 10/2010 | Sato | ................... | G02B 27/0025 348/222.1 |

* cited by examiner

*Primary Examiner* — Robert E Tallman
(74) *Attorney, Agent, or Firm* — Tarolli, Sundheim, Covell & Tummino LLP

(57) ABSTRACT

Systems and methods are provided for optical systems and methods. A compact optical system can include a fore optical assembly, an aft optical assembly, and a phase corrector plate located between the fore optical assembly and the aft optical assembly. The phase corrector plate can have a substantially flat first surface and a set of high order aspherical coefficients on the second surface. In one aspect, the fore optical assembly and the aft optical assembly comprise achromatic doublets, apochromatic triplets, or a combination of elements. In another aspect, a surface of the phase corrector plate is located near or at an optical stop.

20 Claims, 6 Drawing Sheets

OPTICAL SYSTEMS AND METHODS

RELATED APPLICATION

This application is a continuation-in-part of U.S. patent application Ser. No. 14/049,993, filed 9 Oct. 2013, which is incorporated herein in its entirety.

TECHNICAL FIELD

This disclosure relates generally to optics, and more particularly to optical systems and methods.

BACKGROUND

An optical system is an optical device which transmits and refracts light, converging or diverging the beam. Lenses are typically made of glass, crystal or transparent plastics. A simple optical system consists of a single optical element, whereas a compound optical system, or optical assembly, is an array of two or more lenses. Thus, an optical assembly can be a doublet, triplet, or other combination of individual optical elements. In a compound optical system, two or more lenses of different shapes, which can be made of materials with different refractive indices, are arranged one after the other. Optical systems do not form perfect images, however, and there is always some degree of aberration introduced by the optical system which causes the image to be an imperfect replica of the object.

In an imaging system, aberration occurs when light from one point of an object does not converge into a single point after transmission through the optical system collinearly. Chromatic aberration is when a refractive optical system fails to focus different colors transmitted through it to a common convergence imaging point as when the material used to create lenses has a different refractive index for different wavelengths of light. There are several different basic types of aberration which can affect image quality, including astigmatism, coma, spherical aberration, distortion, etc.

An optical system with astigmatism is one where rays that propagate in two perpendicular planes going through the entrance pupil have different foci. If an optical system with astigmatism is used to form an image of a cross, for example, the vertical and horizontal lines will be in sharp focus at two different distances. Coma, or comatic aberration, in an optical system refers to aberration inherent to certain optical designs or due to imperfections of the lens or other components in an optical system. Specifically, coma is a variation in magnification over the entrance pupil. In refractive optical systems, especially those imaging a wide spectral range, coma and astigmatism are a function of field angles and to a smaller part a function of wavelength.

Spherical aberration, astigmatism and coma can be extremely difficult to compensate. Traditionally, a sophisticated series of refractive optical elements with varying properties have been introduced to correct and/or minimize aberrations. However, correcting aberrations by introducing various numbers of optical elements to the optical train increases the complexity of the system. Such an approach would be undesirable for compact configurations, and would substantially increase both the size and manufacturing cost of the system, resulting in many disadvantages, such as greater weight, package volume, fabrication and alignment costs.

SUMMARY

Systems and methods for providing a compact optical system are disclosed. In accordance with one example, a compact optical system includes a fore optical assembly, an aft optical assembly and a phase corrector plate located between the fore optical assembly and the aft optical assembly, wherein the phase corrector plate has a substantially flat first surface and a set of high order aspherical coefficients on the second surface. In accordance with another example, the fore and aft optical assemblies comprise achromatic doublets. The fore and aft optical assemblies may also comprise apochromatic triplets, or a combination of achromatic doublets and apochromatic triplets.

In accordance with still another example, an imaging system mounted within a housing is provided comprising an aperture, a compact optical system to focus incident light with a fore optical assembly, an aft optical assembly, and a phase corrector plate that is substantially collocated with an optical stop and nearly symmetrically located between the fore and aft optical assemblies. The system further includes an image detector that receives light focused by the compact optical system and converts the received incident light to a digital image and a user interface that displays the digital image.

In accordance with yet another example, a method is provided for constructing a compact optical system by constructing a first optical assembly, a second optical assembly, and a phase corrector plate. The first optical assembly is arranged in front of the first surface of the phase corrector plate, and the second optical assembly is arranged after the second surface of the phase corrector plate. The first optical assembly, second optical assembly and phase corrector plate can be aligned by a common optical path. Further, a set of odd high order aspherical coefficients is applied to a surface of the phase corrector plate, and a set of even high order aspherical coefficients is applied to the one of the first optical assembly and/or the second optical assembly. As described in examples, an optical assembly can be a doublet or a triplet, two doublets or two triplets, and so on. The example shown in FIG. 2 is an illustration of an on-axis design, where the optical assemblies share a common optical axis. However, the compact optical system described herein can also be applied to any decentered and tilt optical system, e.g., to optical systems where not all the optical assemblies are aligned by a common optical axis.

DETAILED DESCRIPTION

In an optical system, the focal length of a lens can determine the magnification of the image projected onto the imaging surface, whereas the aperture determines the light intensity of that image. For a given aperture size or optical stop the focal length determines the angle of view, with a shorter focal length resulting in a wider field of view than a longer focal length optical system. An optical system with a wider aperture has a smaller F-ratio, allowing an imaging system to use a faster shutter speed for the same exposure. For example, a relatively small F-ratio of F/2 is defined as the ratio of the effective focal length and size of the optical stop (or pupil) is 2, versus a larger F-ratio of, e.g., F/32. Thus, an optical system with a smaller F-ratio would result in a relatively fast system. Further, by limiting the number of optical elements used in a particular optical system, a relatively compact design can be achieved. By employing a phase corrector plate, situated at or near the optical stop between a fore optical assembly and aft optical assembly, the number of optical assemblies required for a high quality image is reduced. Thus, a fast compact optical system with a moderate field of view is disclosed.

Figure 1:
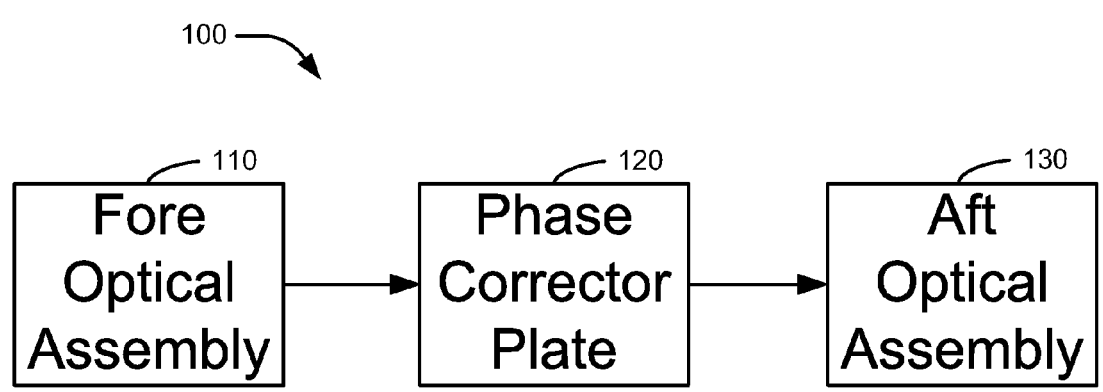
FIG. 1 provides a functional block diagram of a compact optical system.

FIG. 1 illustrates an example functional block diagram of a fast refractive compact optical system 100 in accordance with one example. For a fast optical system with a moderate field of view, the dominate aberrations are spherical aberration, coma, astigmatism, distortion and chromatic aberrations, etc. The example of FIG. 1 is configured to control aberrations for a refractive optical system with a moderate field of view by incorporating optical assemblies in a novel arrangement to achieve a high performance image, including symmetrical placement of at least two optical assemblies on opposite sides of a phase corrector plate, and the application of two pairs of unsymmetrical high order aspherical coefficients to at least two of the optical elements of the optical train.

A substantially symmetrical optical system as described herein is represented by a fore optical assembly 110 separated from an aft optical assembly 130 by a phase corrector plate 120. A theoretical symmetrical optical system comprises fore and aft optical assemblies that are symmetrical with respect to the optical stop. Moreover, a theoretical symmetrical optical system would exhibit zero coma, distortion and lateral color aberrations.

The phase corrector plate 120 can be a thin Schmidt type of phase plate. Thus, the phase corrector plate 120 can be a thin transparent element with a substantially flat first surface and an aspherical second surface, or vice versa. For instance, a set of odd higher order aspherical coefficients can be applied to the second surface of the phase corrector plate and a set of even higher order aspherical coefficients can be applied to at least one of the other optical elements in the fore and/or aft optical assemblies.

Although achieving theoretical results is extremely difficult in practice, employing a substantially symmetrical design and a phase corrector plate in the above-described structural configuration provides for a compact, moderate field of view, and fast optical system which is nearly diffraction-limited. Also, the system and concepts described herein can be extended to other refractive optical systems, from the visible to the infrared band for all applications.

Figure 2:
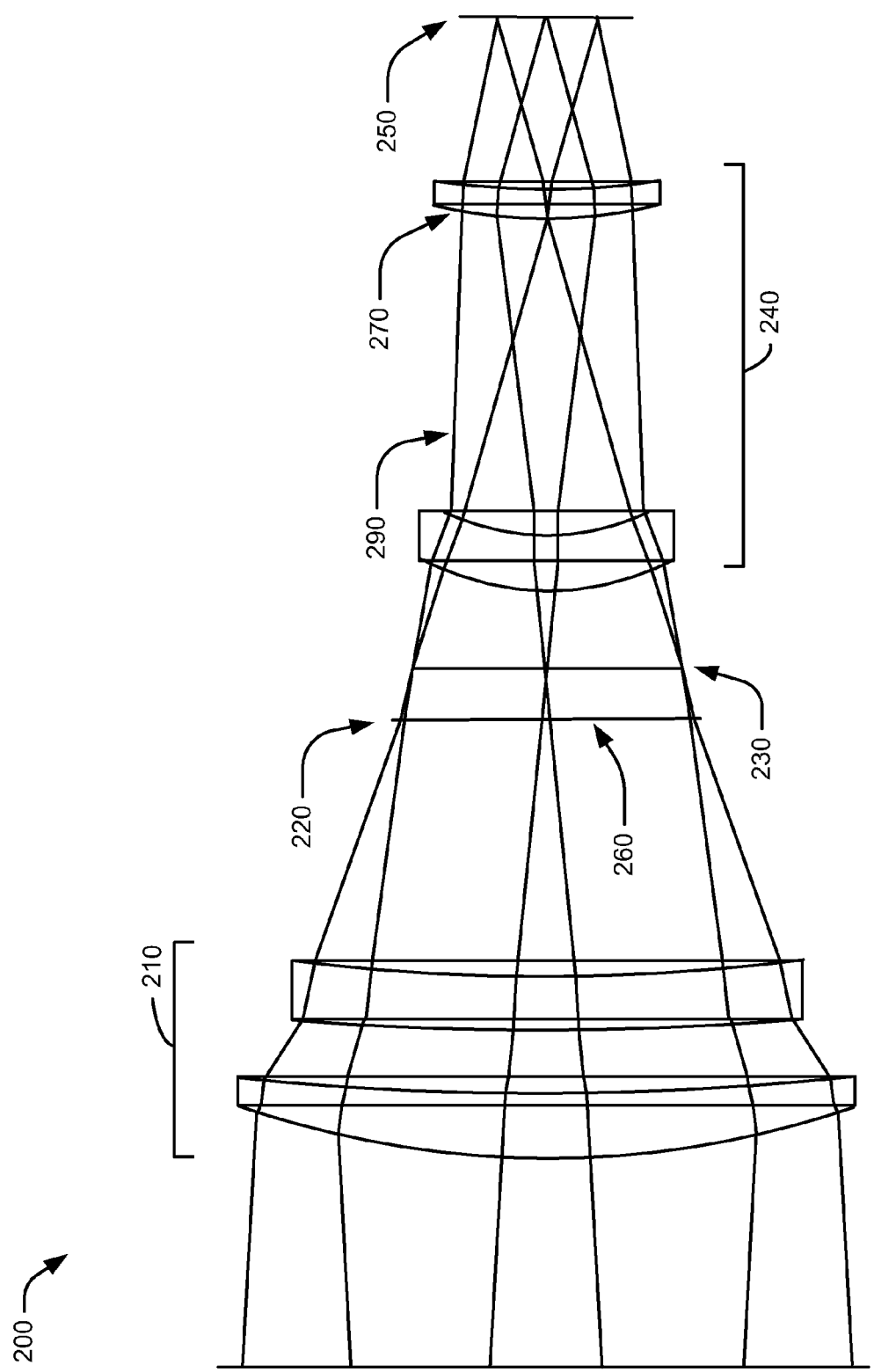
FIG. 2 illustrates an exemplary compact optical system.

FIG. 2 illustrates an expanded example of the compact optical system introduced in FIG. 1. The compact optical system 200 represents an F/2 optical system, a moderate field of view, and two achromatic doublets, wherein an image transmitted through the system would appear on an imaging component 250. The compact optical system 200 includes a phase corrector plate 220 and an optical stop 230 placed near the center of the optical train. In an application of a symmetrical design, a fore achromatic doublet 210 and an aft achromatic doublet 240 are nearly symmetrically located on opposite sides of the phase corrector plate 220 and optical stop 230. To accommodate the phase corrector plate in the system, the separation between any two optical elements in the system has to be of an adequate length to control aberrations which can vary based on the material used to construct the optical elements, as well as the desired application.

Both the fore optical assembly and aft optical assembly can include an air spaced achromatic doublet. However, as shown in FIG. 2, the aft achromatic doublet 240 can be separated by a larger air gap than the fore achromatic doublet 210. This is done because, in practice, complete optical symmetry for objects at an infinite distance is extremely difficult to accomplish. Nonetheless, the modified application of the symmetrical design described herein is capable of significantly reducing aberrations from coma, distortion and lateral color. Moreover, air gaps (e.g., 290) in achromatic doublets are responsible for minimizing aberrations of the secondary color. Therefore, by varying the distance of the air gap within the first doublet and the second doublet, deviations in secondary color can be significantly reduced.

The doublets 210 and 240 can be constructed of the same materials, but may be of different materials. By selecting appropriate optical materials for the optical elements of the doublets 210 and 240, additional improvements to the image quality can be made. For example, longitudinal chromatic aberration can be mitigated by selecting materials with different indices of refraction to suite a specific application. Modifications to this new design concept can also be extended to other refractive optical systems operating from the visible to the infrared spectrum. For example, in the visible spectrum where chromatic aberrations are more sensitive, the achromatic doublets described herein can be replaced with apochromat triplets to better address aberrations from polychromatic light.

In the described arrangement, the fore achromatic doublet 210 becomes the first optical element in the optical train, followed by the phase corrector plate 220, the optical stop 230 and the aft achromatic doublet 240. The phase corrector plate 220 can be a thin plane parallel plate with a set of high order aspherical coefficients on one surface, and operates as the corrector plate in the classical Schmidt camera as described with respect to FIG. 3. It is further recognized that additional elements can be added to the illustrated system to accommodate specific results oriented designs. A beam splitter may be included in the optical train, for example, between the fore and aft optical assemblies. Additionally or alternatively, one or more mirrors or other reflective elements may be employed. In one example, a mirror may be useful for nonlinear or off-axis optical paths.

Furthermore, as mentioned above the entire optical system is not quite symmetrical with respect to the optical stop 230, thus, two pairs of unsymmetrical higher order aspherical coefficients can be applied to the optical train to correct spherical aberration, off-axis coma, and astigmatism. Both odd and even high order aspherical coefficients are employed, equations for which are given below. For an imaging system with a small field of view, a set of even high order aspherical coefficients might be applied to the phase corrector plate 220. In the system described in FIG. 2, a set of odd high order aspherical coefficients are added to the phase corrector plate 220 and even high order aspherical coefficients are added onto the surface of another optical element to accommodate a wider field of view.

Spherical aberration can be substantially controlled by using making the lens from a material with a higher index of refraction, and shaping of the lens surfaces. Remaining spherical aberrations, including higher order aberrations, can be reduced by applying high order aspherical coefficients to the optical elements. As mentioned above, one effective approach is to add a phase corrector plate 220 that contains high order aspherical coefficients at or near the optical stop. In FIG. 2 the phase plate 220 is positioned near the optical stop 230, reducing the spherical aberration (as well as coma and astigmatism) of the aft achromatic doublet 240. Adjusting the distance separating the optical stop 230 and the achromatic doublets 210 and 240 can serve to control aberrations. Both coma and astigmatism are functions of the field angles, thus by positioning the optical stop 230 with respect to the optical power and index of refraction of the optical elements, coma and astigmatism can be substantially minimized. Thus, by pairing phase plate 220 and the fore achromatic doublet 210, the system to further reduce aberrations simultaneously.

In applying the higher order aspherical coefficients to the phase plate and lens, this feature is the application of both the odd and even high order aspherical coefficients in the design. Conventionally, even high order aspherical coefficients are used in systems with a small field of view. In order to provide good performance with a moderate field of view, along with a compact design (e.g., four-element), odd high order aspherical coefficients can be added to the phase corrector plate 220, denoted as surface 260 in FIG. 2, and an even high order aspherical coefficients can be applied to a surface 270 of a lens of the aft achromatic doublet 240. Together, spherical aberration, off-axis coma and astigmatism are more effectively controlled. The remaining small residual aberrations in the compact design are high order chromatic spherical aberration at the edge of the pupil and high order astigmatism. Note that with modern polishing techniques, such as magnetorheological finishing or single point diamond turning and asphere metrology, variable optical null testing can be used to ensure that both odd and even high order aspherical surfaces can be manufactured, tested, and aligned for particular design specifications.

Figure 3:
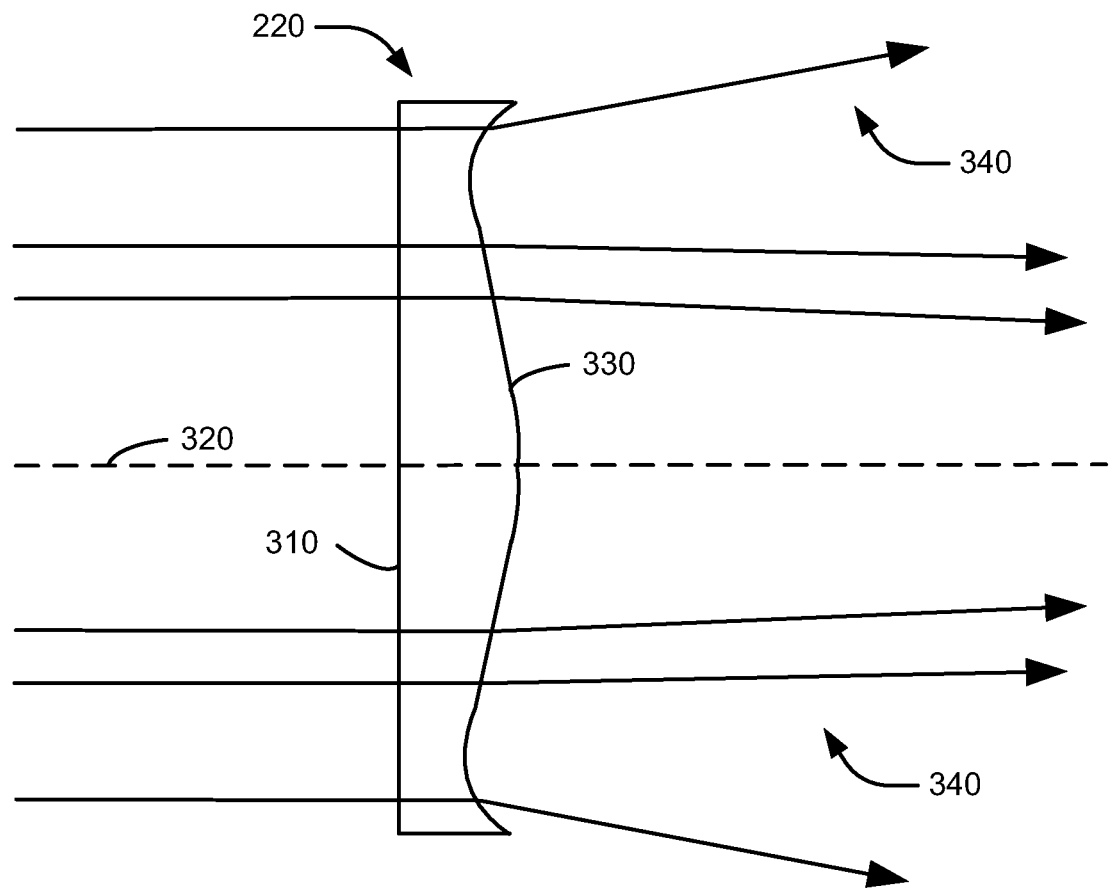
FIG. 3 illustrates a cross-sectional view of a phase corrector plate.

FIG. 3 is a detailed side view of an example phase corrector plate, such as phase corrector plate 220 of FIG. 2. As shown, a front surface 310 facing the fore optic is substantially flat and perpendicular to the optical axis 320. The rear surface 330 is aspherical, where the curvature of the lens bulges in the center, profiles to a minimum before sharply curving upward at the edge, facing the aft optic. The unique aspherical shape of the phase corrector plate 220 aids in minimizing the effects of astigmatism, coma and spherical aberration inherent with a compound refractive optical system. Thus, as light rays 340 are transmitted through the phase corrector plate 220, they travel different optical paths through the lens material and are thereby trained to compensate for aberrations prior to entering the aft optic. As a further advantage, the phase corrector plate 220 can also be employed as a narrow band filter to selectively block out information in unwanted spectral bands. Note that the orientation of the phase corrector plate can be reversed depending on the application, e.g. surface 330 may be the front, placing surface 310 at the rear of element 220.

A conventional refractive optical system cannot compensate for major aberrations without increasing the number of optical elements in the train. However, in a compact environment there is no room for additional optical elements. By applying the principles to the compact design described herein, the system illustrated in FIG. 2 achieves a nearly diffraction limited performance over a moderate field of view. Moreover, in a space optical system this high performance compact system provides savings in weight, and it is easy to build and maintain.

Figure 4:
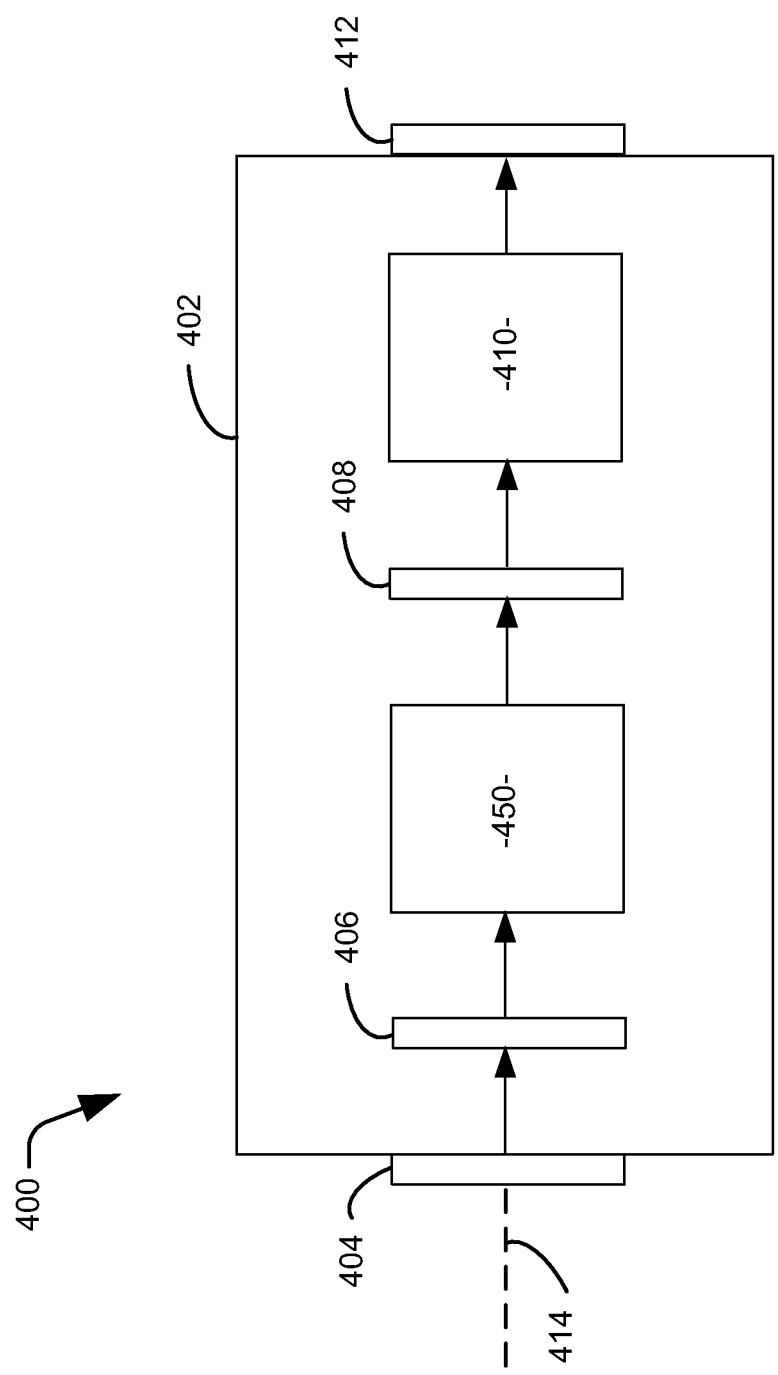
FIG. 4 illustrates an exemplary imaging system containing a compact optical system.

FIG. 4 illustrates an exemplary imaging system 400 utilizing the compact optical system in accordance with another example. The illustrated system 100 can be used for any of a number of applications in which it is desirable to capture images over the visible and infrared spectrums. For example, the system 400 can be mounted in a platform requiring small scale optical focusing systems (e.g., digital camera, mobile telephone, computer mounted optic, telescope, mobile imaging platform).

In the illustrated example, the optical imaging system 400 is configured to provide high performance images within at least the middle infrared to the visual spectral band (e.g., wavelengths of 380 nanometers to 12 micrometers). The optical imaging system 400 includes a housing 402 comprising an aperture 404 of a suitable diameter for the particular wavelength and application. The housing 402 comprises a first surface that collects incident light within a desired range of field angles at an aperture 404 associated with the optical system 400. The compact optical system 450 is located within the housing 402 in line with the aperture 404.

In practice, the materials comprising the lens are selected to transmit light with minimal chromatic aberration. An optical filter 406 can be positioned with the aperture 404 to attenuate light outside of the desired band of wavelengths. While the filter 406 is illustrated herein as free standing, the filter 406 can also comprise a coating on the exterior of the compact optical system 450 within the system 400. Moreover, as explained above with respect to FIG. 2, phase plate 220 can serve as an additional spectral band filter, or can replace filter 406 altogether. In the illustrated implementation, the materials comprising the fore and aft optical assemblies and phase corrector plate are selected to transmit light with minimal chromatic aberration and to have a relatively high index of refraction to provide a wide field of view in a compact configuration.

In operation, light 414 enters the housing 402 through the aperture 404 and filter 406 and travels through the compact optical system 450 that focuses the captured light onto an image detector 408 (e.g., a focal plane array). The image detector 408 translates the focused light into a digital representation of the image received at the aperture 404. Digital electronics and image processing software can compensate for small amounts of distortion, if needed. This digital representation can be provided to any of a variety of image processing systems for analysis and display to an operator. Thus, the image generated by the data analysis component 410 can be provided to an associated user interface 412 for display to a user.

Figure 5:
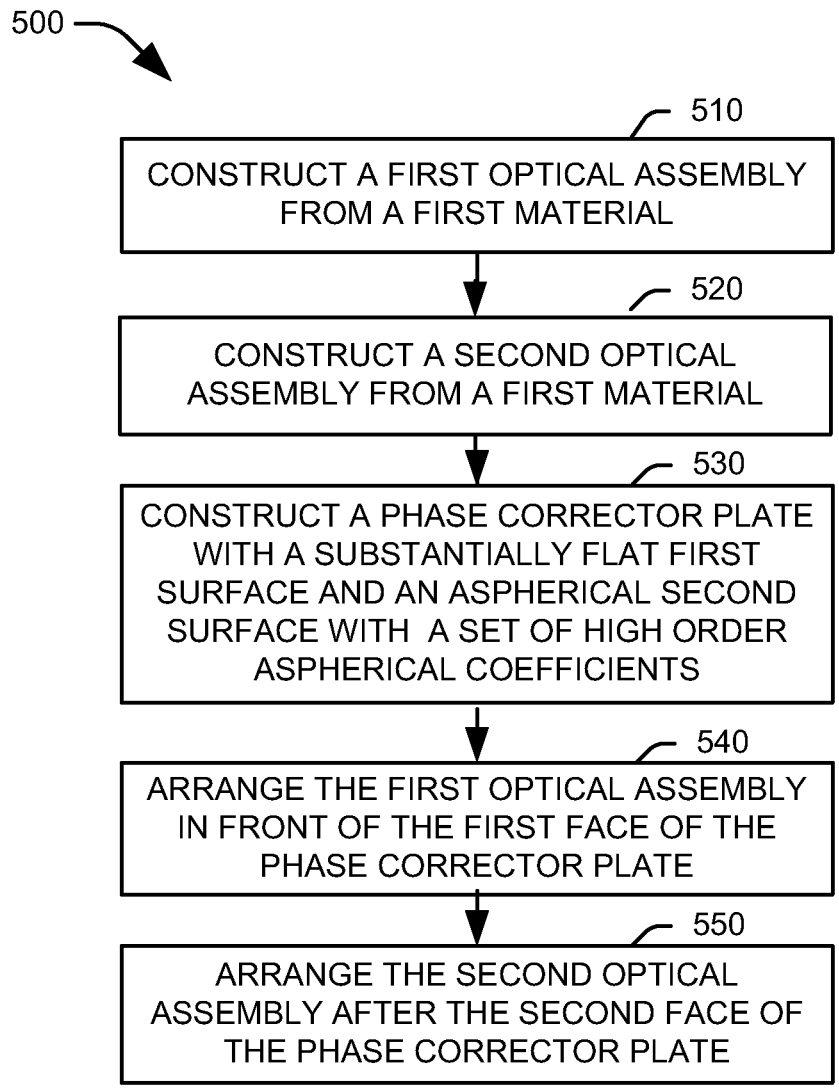
FIG. 5 illustrates an exemplary methodology for constructing a compact optical system.

In view of the foregoing structural and functional features described above, a methodology in accordance with various aspects of the disclosure will be better appreciated with reference to FIG. 5. While, for purposes of simplicity of explanation, the methodology of FIG. 5 is shown and described as executing serially, it is to be understood and appreciated that the methodology is not limited by the illustrated order, as some aspects could, in accordance with the examples presented herein, occur in different orders and/or concurrently with other aspects from that shown and described herein. Moreover, not all illustrated features may be required to implement a methodology in accordance with one or more of the examples.

FIG. 5 illustrates an exemplary methodology 500 for constructing a compact optical system in accordance with another example. At 510, a first optical assembly is constructed from a first material. The optical assembly can be an achromatic doublet, effectively a compound lens with two separate lenses. The lenses can be biconvex lenses with substantially spherical surfaces. The size of the optical assembly is dependent on the desired application, including considerations regarding optical power and space constraints. Further, the material can be selected from any material suitable for optical applications to accommodate the ultraviolet (UV), visible and into the infra-red (IR) spectrums, including but not limited to, Calcium Fluoride, Fused Silica, polymer based compounds, optical glass, Germanium (Ge), Silicon (Si), Zinc Sulfide (ZnS), and Zinc Selenide (ZnSe), etc.

At 520, a second optical assembly can be constructed as an achromatic doublet in a fashion similar to the first optical assembly. The second achromatic doublet may be constructed with lenses of a different size and material from the first achromatic doublet, and may possess different optical characteristics than the first achromatic doublet, as the particular application requires. Additionally, a set of even high order aspherical coefficients can be applied to either the first or second optical element. It is to be appreciated that the optical assembly is not limited to being constructed as an achromatic doublet. In another aspect, the first and second optical assemblies can be constructed as apochromatic triplets to accommodate the visible spectral bands.

At 530, a phase corrector plate is constructed with a substantially flat first surface and an aspherical second surface. A set of high order aspherical coefficients can be applied to the second surface of the phase corrector plate. The phase corrector plate can be constructed from the same material as the first and/or second optical assemblies or a different material. Fabrication of a set of higher order aspherical coefficients can be accomplished by modern diamond-turned technology or other suitable technique. As stated above, the phase corrector plate can be reversed depending on the application.

A set of high order aspherical coefficients is applied to the phase plate and a different set of high order aspherical coefficients is applied to another optical element, respectively. However, even high order aspherical coefficients applied to a phase plate are not optimal to control higher order coma and astigmatism. Thus, an odd high order aspherical coefficient can be applied to the phase plate whereas an even set of high order aspherical coefficients can be applied to the other optical elements.

Several techniques can be used to apply aspheric coefficients to the surface of an optical element. For example, small glass or plastic aspheric lenses can be made by molding. Larger aspheric lenses can be made by grinding and polishing the material. The lenses can be made by point-contact contouring of the lens surface which is then polished to its final shape. In other designs, an aspheric corrector plate, for example, can be made by using a vacuum to distort an optically parallel plate into a curve which is then made flat on one side. Single-point diamond turning is an alternate process, in which a lathe uses a diamond tip to directly cut the desired profile into the optical material. Moreover, several finishing methods can be used to improve the precision and surface quality of the polished surface, such as ion-beam finishing, abrasive water jets, and magnetorheological finishing, in which a magnetically guided fluid jet is used to remove material from the surface. The non-spherical curvature of an aspheric lens can also be created by blending from a spherical into an aspherical curvature by grinding down the curvatures off-axis.

Thus, the example provided describes an optical system for a fast (e.g., F/2) optical system in the 3 micrometer to 5 micrometer region with a plus or minus 3 degree field of view. The system consists of two doublets, where the doublets can be made of a common material or each doublet can be made from different materials (e.g., Ge and Si). A radius of curvature on each of the surfaces and the spacing between each of the elements of the doublet operate to correct longitudinal chromatic aberration and reduce the amount of secondary color.

In calculating the proper coefficients, the even asphere surface model uses only the even powers of the radial coordinate to describe the asphericity. The model uses the base radius of curvature and the conic constant. The sag is the z-component of the displacement of the surface of the lens from the vertex, at a distance r measured from the axis that defines the aspherical curvature of the surface. The surface sag for an even high order aspherical coefficient is given by Equation 1:

$$z = \frac{cr^2}{1+\sqrt{1-(1+k)c^2r^2}} + \alpha_1 r^2 + \alpha_2 r^4 + \\ \alpha_3 r^4 + \alpha_4 r^8 + \alpha_5 r^{10} + \alpha_6 r^{12} + \alpha_7 r^{14} + \alpha_8 r^{16} + \ldots$$

Equation 1 where c is the reciprocal of the radius of curvature, k is the conic constant, r is the radial ray coordinate in lens units, and $\alpha_n$ is the nth aspherical coefficient. The odd asphere model deviation is similar to the even asphere, except both even and odd powers are used. The sag for an odd high order aspherical coefficient is given by Equation 2:

$$z = \frac{cr^2}{1+\sqrt{1-(1+k)c^2r^2}} + \beta_1 r^1 + \beta_2 r^2 + \\ \beta_3 r^3 + \beta_4 r^4 + \beta_5 r^5 + \beta_6 r^6 + \beta_7 r^7 + \beta_8 r^8.$$

Equation 2 where $\beta_n$ is the nth aspherical coefficient and orders higher than $8^{th}$ are all omitted.

Figure 6:
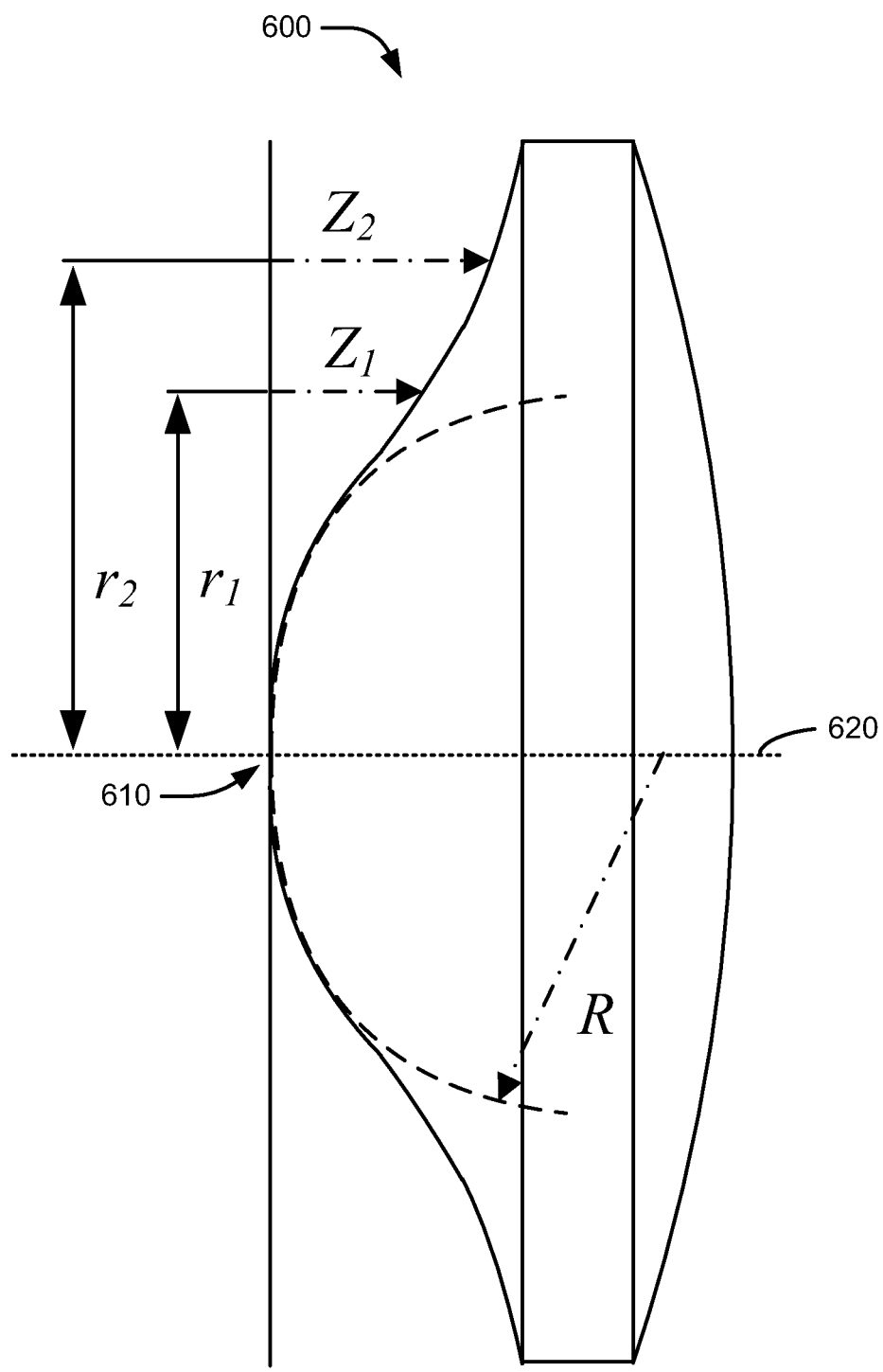
FIG. 6 illustrates an exemplary aspheric biconvex lens demonstrating an application of aspheric coefficients.

An example of an aspheric biconvex lens 600 illustrating the application of aspheric coefficients in accordance with equations 1 and 2 is provided in FIG. 6. The coefficients describe the deviation from an axially symmetric surface as measured from a vertex 610. As shown, $Z_1$ represents the sag for a first aspheric coefficient at a distance $r_1$ from the axis 620, whereas $Z_2$ represents a second sag for a second aspheric coefficient at $r_2$. R represents the radius of a purely spherical element.

As mentioned above, an odd high order aspherical constant is applied to the phase corrector plate and an even high order aspherical constant is applied to another element, for example, on a surface of the aft achromatic doublet. However, with all these efforts, the example shown in FIG. 2 may still have some small amounts of coma, astigmatism, high order spherical aberration, and secondary color. Distortion is small, at about 0.35% with a moderate field of view. However, as mentioned previously, the system is a nearly diffraction limited design. Note that the total optical length, or distance from the first optical surface to the focal plane, is slightly longer than the effective focal length (EFL), further indicating that this is a compact optical system. With the application of another set of high order aspherical constants to another surface in the fore achromatic doublet, a diffraction limited performance is expected.

Returning to FIG. 5, at 540, the first optical assembly is arranged in front of the first face of the phase corrector plate. At 550, the second optical assembly is arranged after the second surface of the phase corrector plate. As such, the phase corrector plate is arranged so as to be nearly symmetrically located between the first and second optical assemblies. Also, adjusting the distance between the optical stop and assembly 510 and assembly 520 can serve to control aberrations, such as coma and astigmatism. Additionally, the phase corrector plate is located together with or physically near the optical stop. In this configuration, the first optical assembly, second optical assembly and phase corrector plate are aligned by a common optical axis.

What has been described above includes exemplary implementations. It is, of course, not possible to describe every conceivable combination of components or methodologies for purposes of describing the examples, but one of ordinary skill in the art will recognize that many further combinations and permutations are possible. Accordingly, the disclosure is intended to embrace all such alterations, modifications and variations that fall within the spirit and scope of the appended claims.

Having described the invention, the following is claimed:

1. A compact optical system comprising:
   a fore optical assembly consisting of either an achromatic doublet or an apochromatic triplet;
   an aft optical assembly consisting of either an achromatic doublet or an apochromatic triplet; and
   a phase corrector plate located between and substantially spatially collinear with the fore optical assembly and the aft optical assembly, wherein the phase corrector plate has a substantially flat first surface and a set of odd high order aspherical coefficients on the second surface, and at least one of the fore optical assembly and the aft optical assembly contains a set of even high order aspherical coefficients.

2. The system of claim 1, wherein the phase corrector plate is collocated with an optical stop and substantially symmetrically located between the fore and aft optical assemblies.

3. The system of claim 2, wherein the fore optical assembly and the aft optical assembly each comprise multiple optical elements, each adjacent pair of elements being separated by an air gap, every air gap separating the fore optical assembly elements being smaller than the largest air gap separating the aft optical assembly elements.

4. The system of claim 1, wherein the phase corrector plate comprises a thin plane parallel plate with the first surface facing the fore optical assembly and the second surface facing the aft optical assembly.

5. The system of claim 1, wherein a surface of the phase corrector plate is located substantially at an optical stop.

6. The system of claim 1, wherein the fore optical assembly and the aft optical assembly are constructed from the same material.

7. The system of claim 1, wherein the fore optical assembly and the aft optical assembly are constructed from a different material.

8. The system of claim 1, wherein the phase corrector plate is constructed from a different material than at least one of the fore optical assembly and the aft optical assembly.

9. An imaging system mounted within a housing, the imaging system comprising:
   an aperture;
   a compact optical system to focus incident light comprising:
      a fore optical assembly consisting of either an achromatic doublet or an apochromatic triplet;
      an aft optical assembly consisting of either an achromatic doublet or an apochromatic triplet;
      a phase corrector plate, wherein the phase corrector plate is collocated with an optical stop and substantially symmetrically and substantially spatially collinearly located between the fore and aft optical assemblies;
   an image detector that receives light focused by the compact optical system and converts the received incident light to a digital image, wherein a straight line distance from a first surface of the fore optical assembly to the image detector is longer than the effective focal length of the compact optical system; and
   a user interface that displays the digital image.

10. The imaging system of claim 9, wherein a set of odd high order aspherical coefficients is applied to a surface of the phase corrector plate.

11. The imaging system of claim 9, wherein a set of even high order aspherical coefficients is applied to at least one of the fore optical assembly and the aft optical assembly.

12. The imaging system of claim 9, wherein the fore optical assembly and the aft optical assembly each consist of an achromatic doublet.

13. A method for constructing a compact optical system comprising:
   constructing a first optical assembly consisting of either an achromatic doublet or an apochromatic triplet from a first material;
   constructing a second optical assembly consisting of either an achromatic doublet or an apochromatic triplet from a second material;
   applying a set of even high order aspherical coefficients to at least one of the first optical assembly and the second optical assembly;
   constructing a phase corrector plate from a third material;
   applying a set of odd high order aspherical coefficients to a surface of the phase corrector plate;
   arranging the first optical assembly in front of the first face of the phase corrector plate; and
   arranging the second optical assembly after the second face of the phase corrector plate, wherein the first optical assembly, second optical assembly and phase corrector plate are configured with a common straight-line optical path, and such that the first optical assembly, phase corrector plate, and second optical assembly are arranged to be substantially spatially collinear.

14. The method of claim 13 further comprising arranging at least one of a mirror and a beam splitter between the first and second optical assemblies.

15. The method of claim 13 further comprising arranging the phase corrector plate with an optical stop that is substantially symmetrically located between the first and second optical assemblies.

16. The method of claim 13 further comprising arranging the distance between the first and second optical assemblies to control coma and astigmatism.

17. The method of claim 13, wherein the first and second optical assemblies are each constructed as an achromatic doublet.

18. The method of claim 13, wherein the first, second and third materials are each different from one another.

19. The system of claim 13, wherein the flat surface of the phase corrector plate is orthogonal to the straight line optical path.

20. The system of claim 1, wherein the fore optical assembly is separated from the phase corrector plate only by an air gap, the phase corrector plate is separated from the aft optical assembly only by an optical stop and air gaps, and the aft optical assembly is separated from an image plane only by an air gap.

* * * * *